United States Patent [19]
Hillestad et al.

[11] Patent Number: 4,915,552
[45] Date of Patent: Apr. 10, 1990

[54] PORTABLE POWER TOOL FOR MILLING TUBE ENDS

[76] Inventors: Tollief O. Hillestad, 108 9th Ave. W., Summerland Key, Fla. 33042; Mark W. Hillestad, 220 Hatch Rd., Wadsworth, Ohio 44281

[21] Appl. No.: 334,314

[22] Filed: Apr. 6, 1989

Related U.S. Application Data

[63] Continuation-in-part of Ser. No. 254,958, Nov. 7, 1988, Pat. No. 4,889,454.

[51] Int. Cl.[4] .................................................. B23B 5/16
[52] U.S. Cl. ..................... 408/125; 408/124; 408/211; 408/702; 409/138; 418/270
[58] Field of Search ............ 408/124, 125, 201, 211, 408/702; 409/138, 175; 418/150, 259, 270

[56] References Cited
U.S. PATENT DOCUMENTS

| | | | |
|---|---|---|---|
| 2,946,315 | 7/1960 | Doeden | 418/270 X |
| 3,700,363 | 10/1972 | Sorensen et al. | 418/270 |
| 4,620,823 | 11/1986 | Hillestad | 409/178 |
| 4,761,104 | 8/1988 | Hillestad | 409/175 |
| 4,819,526 | 4/1989 | Geise | 408/211 X |

*Primary Examiner*—Steven C. Bishop
*Attorney, Agent, or Firm*—Daniel J. Hudak Co.

[57] ABSTRACT

A portable gas operated rotary tool is provided for milling a surface on the end of a cylindrical workpiece. The tool has a motor powered by a pressurized gas, such as compressed air. The motor directly drives a rotary milling head which is axially aligned with the axis of rotation of the motor. The motor has a stator chamber which houses a rotor having radial slots. Vanes are journaled within said slots for radial movement within the slot and define progressively expanding cavities. The milling head has a central bore for mounting on an arbor of the motor. The milling head includes blades for milling a frustoconical surface on the workpiece and a non-locking pilot tube to align the tool with the longitudinal axis of the workpiece. A novel air motor design is also disclosed that provides very high rotary speeds using standard air system pressure, very high horsepower, a low polar moment of inertia and a low torque.

16 Claims, 6 Drawing Sheets

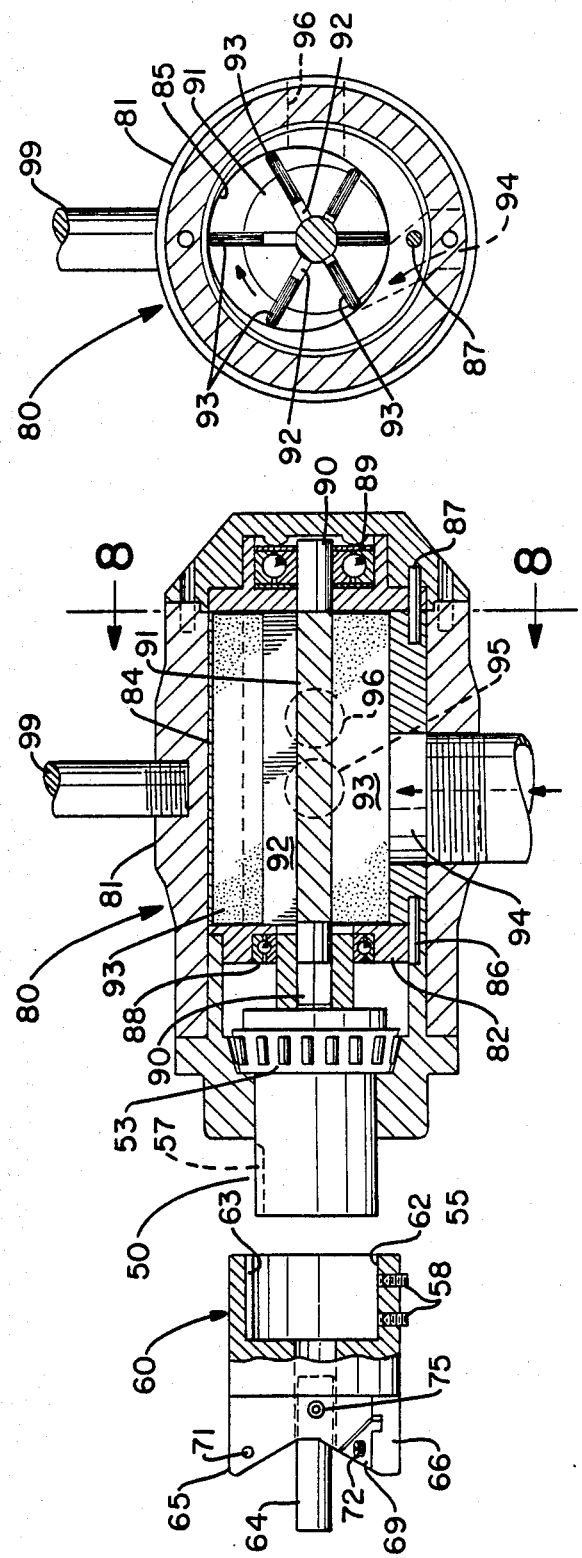

PORTABLE POWER TOOL FOR MILLING TUBE ENDS

CROSS-REFERENCE

This application is a continuation-in-part of copending application Ser. No. 07/254,958 filed Nov. 7, 1988, now U.S. Pat. No. 4,889,454.

FIELD OF THE INVENTION

The present invention relates to portable power tools for milling an end surface on tubular cylindrical workpieces, such as pipes, tubes, etc. More particularly, the invention relates to air pressure-operated cutting tools with a rotary milling head adapted to mill a frustoconical bevel on the end of such tube or pipe to provide, for example, a suitable surface for welding the ends of two such tubes or pipes together in axial alignment. This invention further relates to a unique air motor design for the tool as well as the overall tool assembly.

BACKGROUND

Heretofore, it has frequently been necessary to repair various types of pipe and tube by cutting a section of the pipe out of the line and inserting a new section. Normally, the new section would be welded to the cut ends of the adjacent pipe lengths. In accordance with preferred welding practice, a groove should be provided at the point of weld to permit the molten metal to weld to a relatively large surface area of the pipes. In order to do this, the adjoining ends of the pipe lengths to be welded should be provided with a frustoconical bevel so that when the two ends are placed in alignment, a circumferential groove is formed to receive the molten metal from the welding rod.

Accordingly, the preferred practice is to mill a frustoconical bevel on the respective ends of the pipe lengths.

In many instances, such as in replacing sections of corroded pipe in a boiler, it is necessary to mill the cut end of a pipe which cannot be removed from its installed position. Accordingly, it is desirable to have a portable milling tool which the operator can carry to the desired location and accurately position in alignment with the pipe. Also, it is desirable that the tool be an air pressure-operated type tool, since many working environments might have volatile gases that could be ignited by electric arcing from an electrical power tool.

The prior art devices used for milling operations of this type have utilized an air pressure-operated motor arranged with it the axis of rotation at right angles to the axis of rotation of the milling cutter. Power is transferred from the air motor to the milling cutter through a power transfer arrangement including bevel gears, such as is shown in prior art U.S. Pat. Nos. 4,620,823 and 4,761,104. The power transfer system shown in those patents provides a substantial gear reduction so that the milling head rotates no faster than at a speed of around 100 RPM. These slow speeds require an axial guide pin that is inserted and secured in the end of the tube or pipe to stabilize the milling head during the cutting operation.

More importantly, these prior art devices with a gear reduction arrangement cause great stresses on the gear teeth and, as a result, the teeth are often damaged after only a short period of operation, requiring rebuilding of the tool.

Another problem that is encountered with prior art devices is stalling of the air motor during the grinding operation. Standard air motors used in tools of this type generally develop a high torque at a relatively low speed. Most standard air motors have a relatively large lobe to provide a high chamber expansion in a short axial length. This design provides a relatively large polar moment of inertia for the rotor and thus a relatively slow speed. The result is a high torque and a tendency to stall when too much resistance is encountered.

The tool of the present invention resolves the difficulties indicated above, and affords other features and advantages heretofore not obtainable.

SUMMARY OF THE INVENTION

An aspect of the present invention is to eliminate the need for reduction gears in air-operated, portable milling tools which are utilized to mill beveled surfaces on the ends of tubes, pipes, and the like. The construction is generally compact and less complex than heretofore constructions. Moreover, the time required to mill the beveled surface is drastically reduced.

Another aspect is to provide an improved airoperated motor for a grinding tool of the type described, wherein the rotor has a low polar moment of inertia and a low torque. Locking of the tool to the part to be ground is thus not required. The motor also has a high rotary speed and horsepower using standard air pressure.

The tool of the present invention is specifically adapted to mill or grind a frustoconical beveled surface on the end of a tubular, cylindrical workpiece (i.e., pipe or tube end) having a longitudinal axis. The tool has a housing that defines a central axis and that contains a rotary air motor mounted in its rearward end, the motor having a shaft that rotates about the central axis. A fitting is provided for supplying air under pressure through the housing to the rotary motor. Located at the forward end of the housing is a tool coupler assembly or collet that includes a spindle journaled therein and connected at its rearward end to the rotary shaft of the air motor. Located on the arbor of the spindle is a rotary milling head attachable to the coupler for rotation about the central axis. The milling head has a non-locking central pilot tube extending forwardly thereof and adapted to be inserted with close tolerances in the open end of the tube or pipe to be milled and to position the cutting head in proper axial alignment with the tube or pipe during the milling operation.

The housing is also provided with handles or other holding means so that the tool may be positioned by an operator with the central axis of the tool in alignment with the longitudinal axis of the workpiece, whereby rotation of the milling head mills a frustoconical beveled surface on the workpiece.

BRIEF DESCRIPTION OF THE DRAWINGS

FIG. 7 is a partially exploded, sectional view showing the milling tool of FIG. 6 with parts broken away for the purpose of illustration;

FIG. 8 is a transverse sectional view taken on the line 8—8 of FIG. 7;

DETAILED DESCRIPTION OF THE INVENTION

Figure 1:
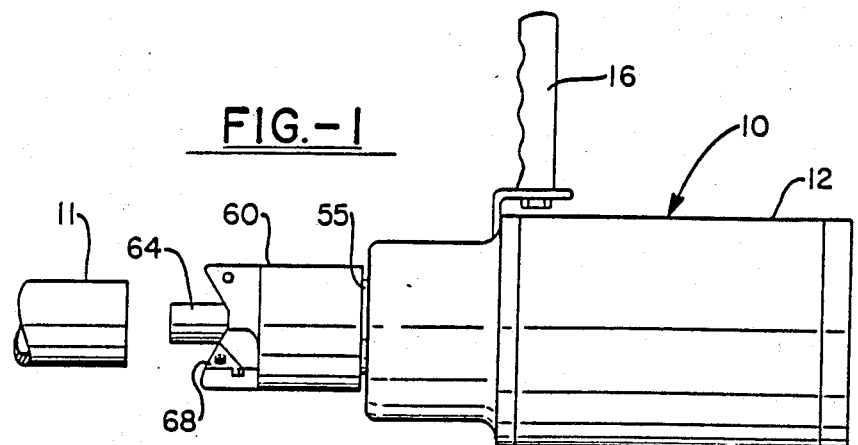
FIG. 1 is a side elevation of a rotary air-operated milling tool embodying the invention.
Figure 3:
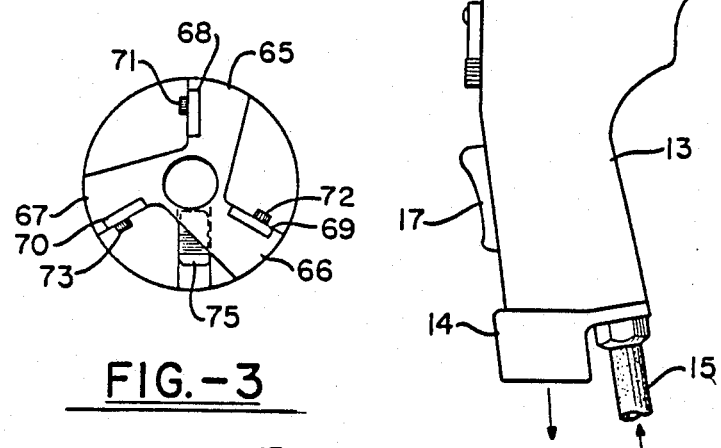
FIG. 3 is a front end elevation showing the milling head of FIG. 2.

Referring more particularly to the drawings, and initially to FIG. 1, there is shown a portable rotary cutting tool 10 for milling a frustoconical end surface on an open end of tubular, cylindrical workpieces 11 such as pipes, tubes, etc. The tool includes as its principal components a cylindrical housing 12, an air motor assembly 20, a spindle assembly 50, and a milling head 60.

The cylindrical housing 12 has a pistol grip handle 13 attached thereto with a hose fitting 14 at its outer end and adapted to receive a pressure hose 15 which is pressured by a gas, such as compressed air. Extending from the opposite side of the housing is a stabilizer handle 16. An operator of the tool holds the tool with both hands and actuates the motor by means of a switch on the handle 13 which actuates a solenoid valve which controls the pressure line from an air compressor. The operator places the tool 10 with the milling cutter 60 in axial alignment with the tube or pipe 11 and, while holding the tool correctly in position, actuates the air motor to initiate the milling operation and to cut a beveled surface on the end of the pipe 11.

Figure 4:
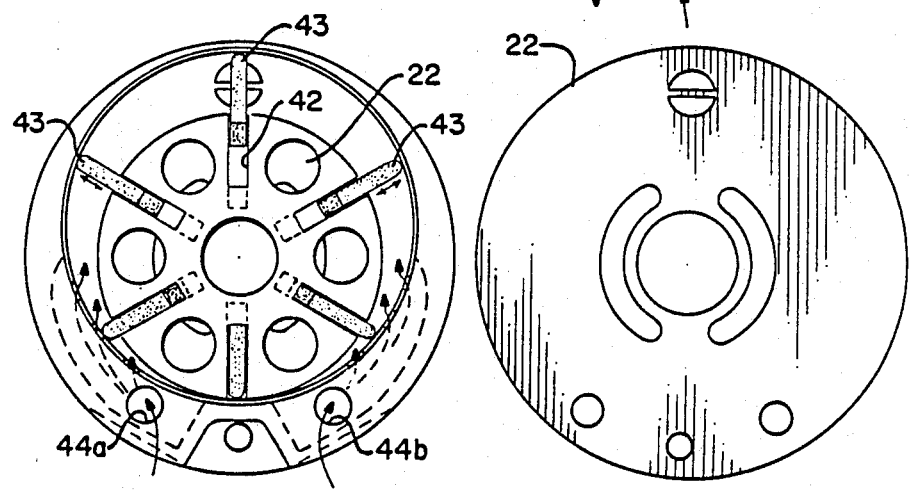
FIG. 4 is a transverse, sectional view of the air motor used to drive the rotary milling tool of the invention taken on the line 4—4 of FIG. 2.
Figure 5:
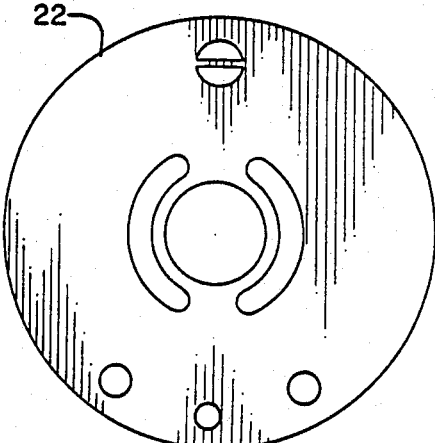
FIG. 5 is a transverse, sectional view of the air motor taken on the line 5—5 of FIG. 2.

The air motor assembly 20 includes a stator with a front plate 22, a rear plate 23, and a cylindrical stator ring 24 (FIG. 4). The front plate 22, rear plate 23 and stator ring 24 are all provided with a brass liner to define the eccentric stator chamber 25. The various components of the stator are held in proper alignment by a locator pin 27. A forward bearing assembly 28 is located adjacent the outer surface of the front plate 22 and another bearing assembly 29 is formed integrally with the rear plate 23. The bearings 28 and 29 serve to journal the rotor shaft 30 at its opposite ends.

The rotor shaft 30 has its forward end that is journaled in the bearing assembly 28, provided with a forwardly extending splined section 32. The rearward end of the rotor shaft is journaled in the bearing assembly 29. A rotor 35 is located within the stator chamber 25. The chamber 25 has a circular cross-section but is eccentric with respect to the axis of rotation of the rotor 35, which coincides with the axis of the rotor shaft 30.

Rotor 35 is desirably lightweight and made from a lightweight material such as aluminum, e.g., as from aluminum bar stock. Moreover, stator chamber 25 can also be made from aluminum. The rotor and optionally the stator is hardened and desirably has a Rockwell A hardness of at least 50 and preferably at least 58.

The rotor 35 is provided with six symmetrically spaced radial slots 42, each of which receives a radial vane 43 having a convex inner surface. The floor of each slot 42 has a curved shape that coincides with the convex inner surface of a vane 43. When the motor is engaged, the vanes are forced outward so that the outer surface bears against the inner surface of the chamber 25. The vanes 45 divide the chamber 25 into asymmetrical lobes.

The vanes 43 slide in radial directions between a retracted position in the slot where the straight distal surface of the vane bears against the surface of the stator chamber at the shortest radial distance. As the rotor turns in a clockwise direction, the radial vanes 43 move radially outward to maintain engagement with the surface of the lobed chamber 25 until they reach the maximum extension illustrated at the upper portion of the lobe as shown in FIG. 4. Accordingly, the radial vanes 43, the outer surface 41 of the rotor 35, and inner surface of the stator chamber define progressively expanding cavities, i.e. the lobes. The resulting expansion of the compressed air produces continuous rotation of the rotor.

Compressed air enters the lobed stator chamber 25 at an inlet 44a or 44b, respectively, formed at the bottom of the stator ring 24 and exits through an exit port 45 formed in the front plate at the top of the chamber. The air enters through 44a for a clockwise rotation of the rotor and through 44b for counter clockwise rotation.

The air motor thus described is adapted to turn at speeds of between 4500 and 5000 RPM.

Figure 2:
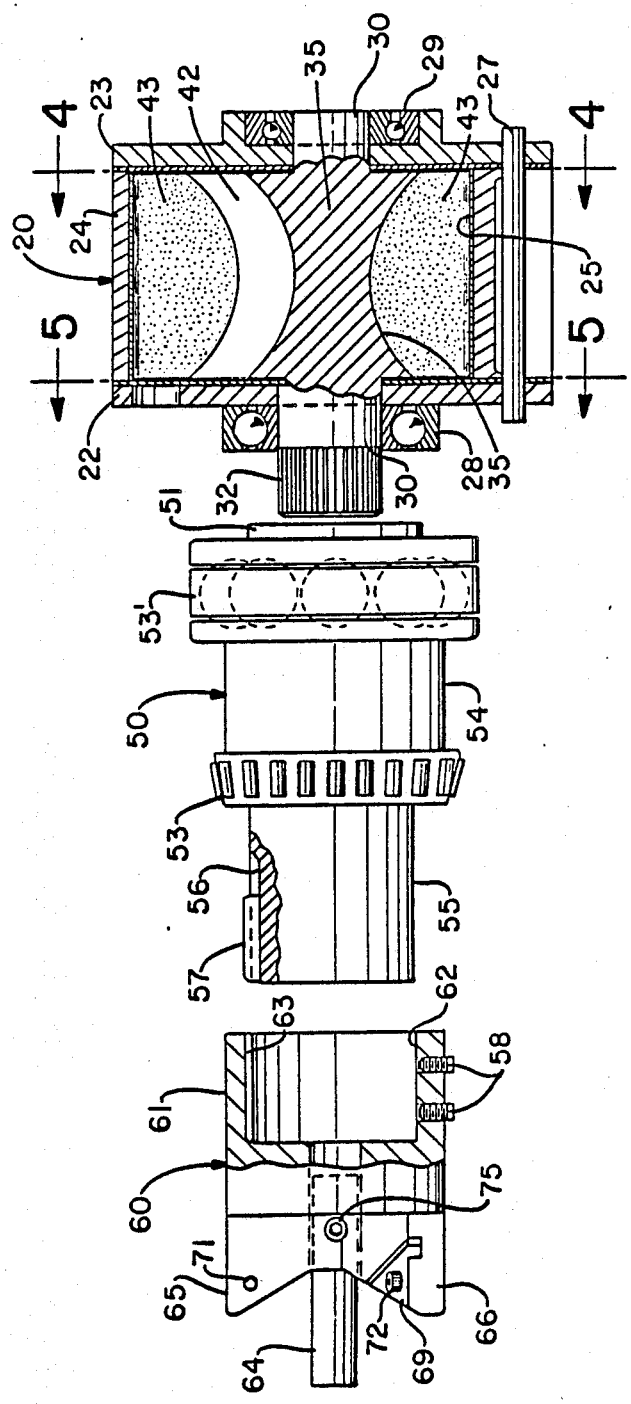
FIG. 2 is a partial exploded, elevational view showing the cutting tool, and with parts broken away and shown in section for the purpose of illustration.

FIG. 2 shows the spindle assembly 50 which includes a spindle shaft 51 with a recess formed at its inner end and having internal splines. The internal splines mesh with the splined end 32 of the rotor shaft 30 to couple the spindle assembly to the motor.

The assembly includes bearing units 53 and 53' which are mounted in a spindle housing 54 and in which the spindle is journaled The forward end of the spindle has an arbor 55 with a longitudinal slot 56 that receives a key 57.

The milling cutter 60 is removably secured to the arbor and may be quickly removed so that different sized milling cutters for different size pipe, etc. may be easily mounted and replaced on the arbor. The cutter has cylindrical body 61 with a bore 62 formed in its rearward end. The bore has a longitudinal slot 63 that cooperates with the key 57 seated in the slot 56 to lock the cutter to the arbor. The cutter 60 is also retained against axial movement on the arbor 55 by set screws 58 located in threaded radial bores in the body of the cutter.

Located in an axial bore in the forward end of the body 61 is a pilot tube 64 which is adapted to be inserted in the open end of the pipe 11 to help position the milling cutter correctly during the milling operation. The pilot tube is secured in the body 61 by a set screw 75 located in threaded radial bores in the body.

Also formed in the forward end of the milling cutter are three symmetrically arranged, axially extending radial blade supports 65, 66, and 67 that extend in a forward direction Each of the blade supports 65, 66, and 67 has a cutting blade 68, 69, and 70 secured thereto with set screws 71, 72, and 73. Accordingly, the cutting blades 68, 69, and 70 may be replaced on the end of the milling cutter when they become worn.

Operation

The operation of the tool thus described will be considered as beginning at a point when an appropriate milling cutter 60 has been mounted on the arbor 55 and the pressure hose 15 has been connected to the tool. The operator holding the tool by one hand on the pistol grip 13 and with the other hand in the stabilizer handle 16 lifts the tool and aligns it with the open end of the pipe 11 to be milled. The pilot tube 64 is inserted in the open end of the pipe 11 to help support the tool 10 in axial alignment. Then the operator presses the switch 17 to actuate the air motor 20 to begin the high-speed turning of the spindle assembly 50. A typical rotary speed for the tool is from about 2,500 RPM to about 6,000 RPM and preferably from about 4500 to about 5000 RPM. While the pilot tube 64 must rotate within the open end of the pipe, sufficient clearance is provided that there is a minimum friction resisting rotation of the pilot tube.

With the tool in this condition, the operator moves the milling cutter 60 forward until the blades 68, 69, and 70 engage and begin to cut or mill a beveled surface in the open end of the pipe 11. Because of the high speed of the tool that results from a unique arrangement of the air motor 20, spindle assembly 50, and milling cutter 60, a frustoconical surface may be milled within five seconds This represents a substantial improvement over prior art devices, which generally required about one minute to place the same beveled surface on the end of a pipe. Once the beveled surface has been milled, the operator retracts the pilot tube 64 from the end of the pipe and deactivates the air motor. Another important advantage is that various reduction gears which re generally utilized in prior art devices have been eliminated thereby resulting in weight reduction, cost savings, and the like.

Figure 6:
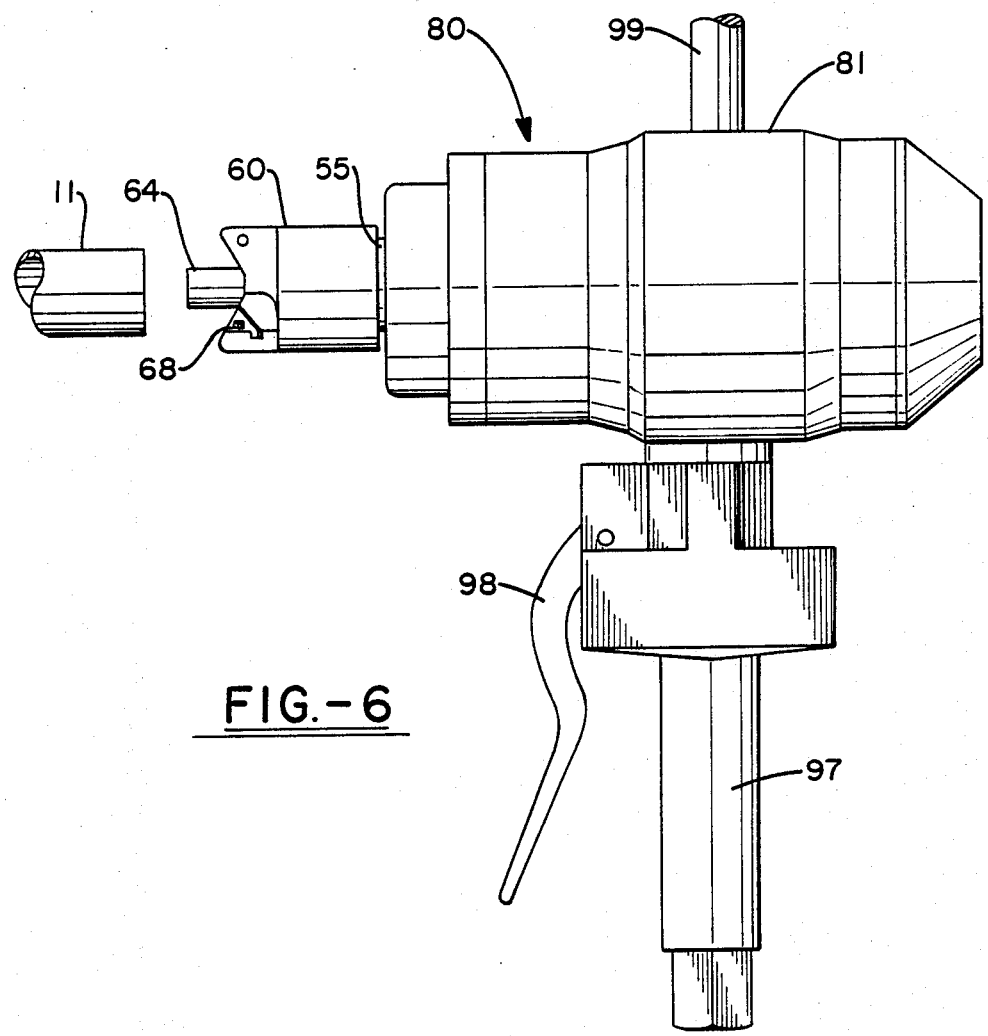
FIG. 6 is a side elevation of another form of rotary air-operated milling tool embodying the invention.

FIGS. 6, 7 and 8

FIGS. 6, 7 and 8 illustrate another form of the invention wherein the tool assembly includes a uniquely designed air motor that differs from the air motor assembly 20 shown in FIGS. 1 through 5. The air motor 20 is essentially a standard commercially available air motor generally operating at speeds of about 3,500 RPM. The air motor illustrated in FIGS. 6 through 8 and in fact in FIGS. 9 and 10 as well, is identified by the numeral 80 and is designed to minimize the lateral dimensions or diameter of the motor while at the same time achieving higher rotational speeds.

The air motor assembly 80 has a housing 81 that receives an elongated generally cylindrical stator closed at its axial ends by a front plate 82 and a rear plate 83. Located between the plates 82 and 83 is a cylindrical stator ring 84 that defines an eccentric stator chamber 85. The front plate 82, rear plate 83 and stator ring 84 are all secured and retained within the housing 81 and are located in a predetermined relation by means of a front locator pin 86 which keys the front plate to the stator ring 84 and a rear locator pin 87 which keys the rear plate 83 to the stator ring 84.

A forward bearing assembly 88 is located adjacent the outer surface of the front plate 82 and another bearing assembly 89 is formed integrally with the rear plate 83. The bearing assemblies 88 and 89 serve to journal the rotor shaft 90 at its opposite ends.

The rotor shaft 90 has its forward end journaled in the bearing assembly 88 and is also provided with a forwardly extending splined section. The rearward end of the rotor shaft 90 is journaled in the bearing assembly 89. A rotor hub 91 integral with the shaft 90 is located within the stator chamber 85. As indicated above, the stator chamber 85 has a circular cross section but is eccentric with respect to the axis of rotation of the rotor shaft 90.

The rotor hub 91 is desirably made from a lightweight material such as aluminum. The stator ring 84 and front and rear plates 82 and 83 are also desirably made of aluminum and are preferably hardened to provide a Rockwell Hardness of at least 50 and preferably at least 58.

The rotor hub 91 is provided with six symmetrically spaced, radial slots 92 each of which receives a radial vane 93. The vanes have a generally rectangular shape and the slots are also rectangular and coincide with the respective dimensions of the vanes.

When the motor 80 is energized, the radial vanes 93 are forced outwardly so that their outer surfaces bear against the inner surface of the stator chamber 85. The vanes 93 slide in radial directions between a retracted position in the slot wherein the distal surface of the vane bears against the surface of the stator chamber at the shortest radial distance As the rotor hub turns in a clockwise direction, the radial vanes 93 move radially outward to maintain engagement with the surface of the eccentric stator chamber 85 until they reach the maximum extension at the upper portion of the lobe as shown in FIG. 8. Accordingly, the radial vanes 93, the outer surface of the rotor hub 91 and the inner surfaces of the stator chamber 85 define progressively expanding elongated cavities. The resulting expansion of the compressed air produces continuous rotation of the rotor.

Compressed air enters the stator chamber 85 at an inlet port 94 formed in the housing 81 at the bottom of the stator ring 84 and exits through a pair of circular exhaust ports 95 and 96 that extend through both the stator ring and housing and which are located at a point that is spaced between about 180 degrees and 270 degrees of rotor rotation from the inlet port 94. More desirably, a rotor rotation of about 180 degrees to about 245 degrees is preferred.

Because the exhaust ports 95 and 96 are not diametrically opposed to the inlet port 94 but rather spaced substantially therefrom, the motor is capable of operating only in a clockwise direction. It cannot be reversed to provide counter clockwise rotation as can the motor assembly 20 of FIGS. 1 through 5.

The air motor assembly 80 is energized by means of an air valve located in a handle assembly 97 and manually activated by means of a valve lever 98. An additional grip 99 is secured to the housing 81 opposite the handle assembly 97 to assist the operator in holding and operating the tool.

The splined forward end of the shaft 90 is coupled to a spindle assembly 50 and thus to the milling cutter 60. The spindle assembly 50 and cutter 60 are identical to those shown and described with respect to the tool assembly of FIGS. 1 through 5.

It will be apparent from a comparison of the air motor assembly 80 with the air motor 20 that the unique construction of the assembly 80 affords a lower polar moment of inertia and thus is inherently capable of operating at greater speeds with the same air pressure, the standard operating air pressure being about 90 psig. The lower polar moment of inertia is achieve by using radial vanes with a smaller radial dimension and smaller radial extension but with a greater axial dimension. Thus, the improved operational capabilities are achieved by having a larger ratio of vane axial length to total vane radial extension, desirably a ratio between about 1.2 and 2.0, and preferably between 1.4 and 1.8. The actual maximum radial extension of the vane to the diameter of the rotor hub is from about 0.02 to about 0.25, desirably from about 0.05 to about 0.20 and preferably from about 0.1 to about 0.15.

In the air motor assembly 80 illustrated in the drawings, the actual length of the rotor hub is 4.4 inches and the maximum travel of the radial vanes 0.365 inches. This permits rotary speeds of between about 5,000 to about 7,000 RPM and preferably from about 6,000 to about 7,000 using standard air pressure (i.e., about 90 psig).

The higher RPM along with the design of the air motor enables the motor assembly to achieve a horsepower rating in excess of 5 horsepower and preferably about 5.8 horsepower. With the design described, the motor has relatively low torque and thus is vulnerable to stalling. The low torque aspect is actually a safety feature since upon stalling the milling tool will not turn or twist an operator's hand. Inasmuch as the motor assembly rotates at high speed but has low torque, central pilot tube 64 while although matingly engaging a workpiece is not secured or locked thereto. Rather, a small clearance exists such as on the order of approximately 0.020 inch and the pilot tube turns with the milling head. Thus, an accurate but non frictional alignment is achieved. The net result is that the milling time required to mill a tube or the like is drastically reduced. For example, milling of tube ends can be achieved using the air motor 80 within a matter of seconds. Under actual operating conditions, tube ends have been milled in generally under 30, desirably under 20 seconds, and preferably under 10 seconds and in some cases even within 3 to 5 seconds This compares favorable with the milling times required for prior art air-operated milling tools which required from 2 to 3 minutes for each milling operator

Figure 9:
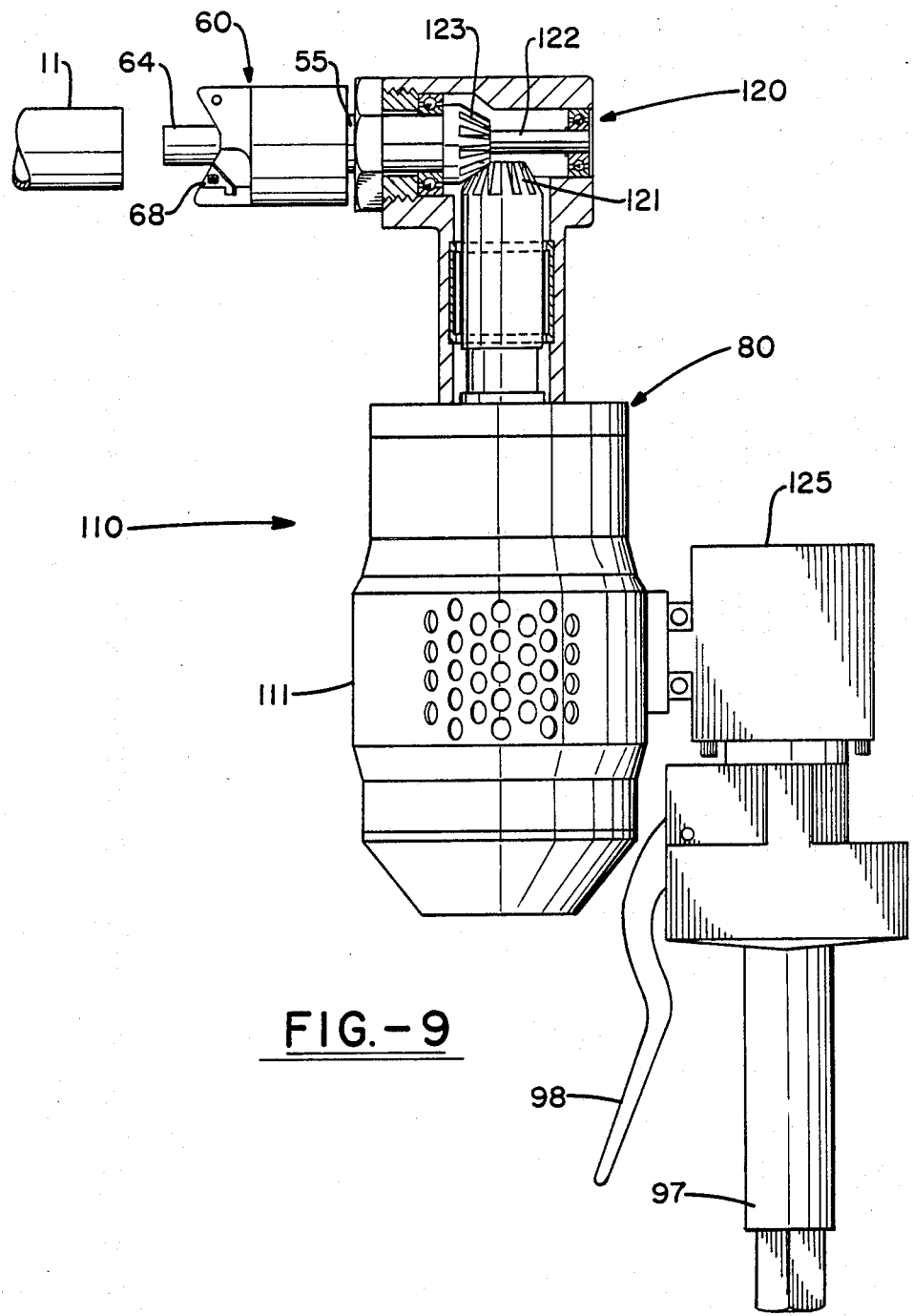
FIG. 9 is a side elevation of still another form of rotary air-operated milling tool embodying the invention.
Figure 10:
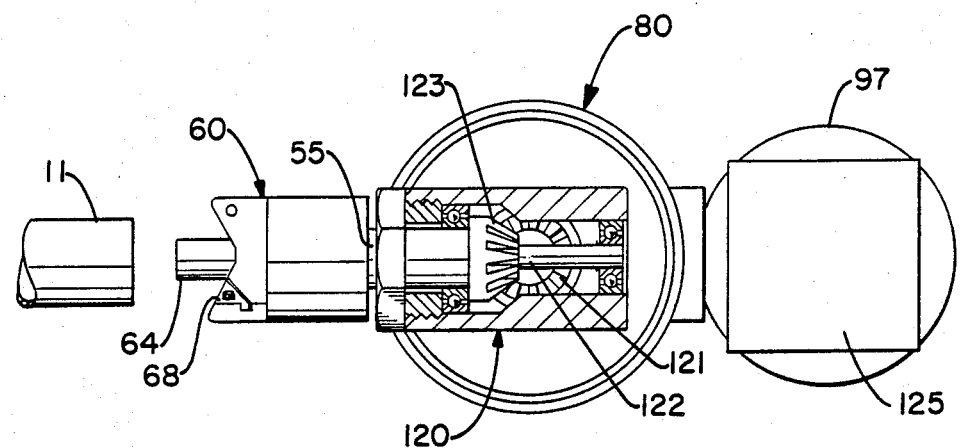
FIG. 10 is a top elevation of the milling tool of FIG. 9 with parts broken away for the purpose of illustration.

FIGS. 9 and 10

FIGS. 9 and 10 illustrate still another form of milling tool assembly 110 embodying the invention but where in the configuration of the tool is changed to accommodate a different type of milling environment. The tool assembly 110 of FIG. 9 minimizes the axial length required for the milling operation, with references to the axis of the tube 11 to be milled. In other words, the tool is adapted for use when insufficient axial space would be available for using the tool of either FIGS. 1 through 5 or 6 through 8.

The tool assembly 110 has a housing 111 which contains an air motor assembly that is essentially identical to the air motor assembly 80 of FIGS. 6 through 8. The principal difference is that the output from the air motor is to a shaft on which is keyed a right-angle-drive output head 120 with a bevel gear 121 formed at its outer end. The bevel gear is located in a right-angle-drive transfer housing in which is journaled a shaft 122 for another meshing bevel gear 123.

As will be apparent, the axis of the shaft 122 is at right angles to the axis of the air motor and its output drive. The milling head 60 is connected to an output shaft of the bevel gear 122 in the same manner as before.

Another aspect of the tool assembly 110 is the means for connecting the air motor assembly 80 to the handle assembly 98 with the air valve located thereon The handle assembly 97 is actually connected to an adapter 125 which has one side thereof connected to the housing 111 at the location of the inlet port of the air motor. This arrangement assists in achieving a minimal space profile for the tool assembly 110 as will be apparent by comparison of the device of FIGS. 9 and 10 with the device of FIGS. 6 through 8.

While in accordance with the Patent Statutes, the best mode and preferred embodiment has been set forth, the scope of the invention is not limited thereto, but rather by the scope of the attached claims.

What is claimed is:

1. A portable, gas-operated rotary tool for milling a surface on an end of a tubular workpiece, comprising:
   a gas-operated radial-vane-type rotary motor having a rotor hub with a plurality of radial vanes slidably mounted therein and a tubular stator defining an eccentric stator chamber with a lobe shaped transverse cross-section, said rotor hub, radial vanes and stator chamber defining a plurality of expansible cavities, the ratio of the axial length of said stator chamber to the maximum radial extension of said vanes being between about 1.2 and about 1.8;
   first means in said stator defining a gas inlet adapted to admit gas under pressure to said expansible cavities when in their minimal volume condition;
   second means in said stator defining a gas outlet for exhausting gas from said expansible cavities;
   a rotary milling head operatively connected to said rotary motor;
   a pilot tube means connected to and extending forwardly from said milling head for insertion in said tubular workpiece; and
   non-locking means for aligning said tool whereby an operator may position said milling head with said guide means inserted in an end of said tubular workpiece so that rotation of said milling head mills a surface on the respective end of said tubular workpiece.

2. A portable rotary tool as defined in claim 1, wherein said air motor has a rotary speed of between about 5,000 and about 7,000 RPM.

3. A portable rotary tool as defined in claim 1, wherein said gas outlet is circumferentially spaced between about 200 degrees to about 270 degrees of rotor rotation from said gas inlet.

4. A portable rotary tool as defined in claim 1, wherein the output from said air motor is coupled to a right angle drive which is connected to said rotary milling head whereby the axis of said milling head is at about 90 degrees relative to the axis of said air motor.

5. A portable rotary tool as defined in claim 1, wherein said guide means comprises a cylindrical pin coaxial with said central axis.

6. A portable rotary tool as defined in claim 1, wherein said milling head is adapted to mill a frustoconical surface on said workpiece.

7. A portable rotary tool as defined in claim 6, wherein said frustoconical surface defines a forwardly and inwardly extending annular bevel.

8. A portable rotary tool as defined in claim 1, wherein said rotary motor is made from a lightweight material.

9. A portable rotary tool as defined in claim 8, wherein said rotary motor is made from aluminum.

10. A portable, compressible fluid operated rotary milling tool, comprising:
    a pneumatically operated radial-vane-type rotary motor having a rotor hub with a plurality of radial vanes slidably mounted therein and a tubular stator defining an eccentric stator chamber, said rotor hub, radial vanes and stator chamber defining a plurality of expansible cavities, the ratio of the axial extension of said vane to the diameter of said rotor hub being from about 0.02 to about 0.25; a pneumatic gas inlet means adapted to admit gas under pressure into said expansible cavities when in their substantially minimal volume condition;

an outlet means in said stator defining a gas outlet for exhausting gas from said expansible cavities;

a rotary milling head operatively connected to said rotary motor; and a pilot tube means connected to and extending forwardly from said milling head for a non-locking insertion into a tubular workpiece.

11. A portable rotary tool as defined in claim 1, wherein said gas outlet is circumferentially spaced between about 180 degrees to about 270 degrees of rotor rotation from said gas inlet.

12. A portable rotary tool as defined in claim 11, wherein the ratio of the axial length of said stator chamber to the maximum radial extension of said vanes is from about 1.4 to about 1.8.

13. A portable rotary tool as defined in claim 12, wherein said gas outlet is circumferentially spaced between about 180 degrees to about 245 degrees of rotor rotation from said gas inlet, and wherein said rotary milling head is directly driven by said radial-vane-type rotary motor.

14. A portable rotary tool as defined in claim 13, wherein said air motor has a rotary speed of between about 6,000 and about 7,000 RPM.

15. A portable rotary tool as defined in claim 14, wherein said rotary motor is made from aluminum.

16. A portable rotary tool as defined in claim 11, wherein said rotary milling head is directly driven by said radial-vane-type rotary motor.

* * * * *